US005793535A

United States Patent [19]
Ito et al.

[11] Patent Number: 5,793,535
[45] Date of Patent: Aug. 11, 1998

[54] ZOOM LENS HAVING HIGH ZOOM RATIO

[75] Inventors: Takayuki Ito, Tokyo; Sachio Hasushita, Hokkaido, both of Japan

[73] Assignee: Asahi Kogaku Kogyo Kabushiki Kaisha, Tokyo, Japan

[21] Appl. No.: 734,267

[22] Filed: Oct. 21, 1996

[30] Foreign Application Priority Data

Oct. 25, 1995 [JP] Japan .................... 7-278026

[51] Int. Cl.$^6$ ...................... G02B 15/14; G02B 9/12
[52] U.S. Cl. ...................... 359/689; 359/791; 359/683
[58] Field of Search ...................... 359/689, 791, 359/683

[56] References Cited

U.S. PATENT DOCUMENTS

| | | | |
|---|---|---|---|
| 4,773,744 | 9/1988 | Yamanashi | 359/689 |
| 4,840,467 | 6/1989 | Takada et al. | 359/689 |
| 4,978,204 | 12/1990 | Ito . | |
| 5,272,566 | 12/1993 | Aoki | 359/686 |
| 5,559,636 | 9/1996 | Ito | 359/689 |
| 5,606,460 | 2/1997 | Ohtake | 359/689 |

FOREIGN PATENT DOCUMENTS 2-73211  3/1990  Japan .

*Primary Examiner*—Georgia Y. Epps
*Assistant Examiner*—Evelyn A. Lester
*Attorney, Agent, or Firm*—Greenblum & Bernstein P.L.C.

[57] ABSTRACT

A zoom lens includes a positive first lens group, a positive second lens group, and a negative third lens group, in this order from the subject side. The first lens group consists of a negative first lens element, a positive second lens element and a positive third lens element in this order from the object side and satisfies the following relationships:

$4.3 < m_{3T} < 6$ $1.7 < f_T / f_{1G} < 3$ $31 < v_1 < 55$ $0 < v_2 - v_1 < 30$ where "$m_{3T}$" represents the lateral magnification of the third lens group at the longest focal length position, "$f_T$" represents the focal length of the entire lens system at the longest focal length position, "$f_{1G}$" represents the focal length of the first lens group, "$v_1$" represents the Abbe number of the negative first lens element of the first lens group, and "$v_2$" represents the Abbe number of the positive second lens element of the first lens group.

13 Claims, 12 Drawing Sheets

FIG. 5
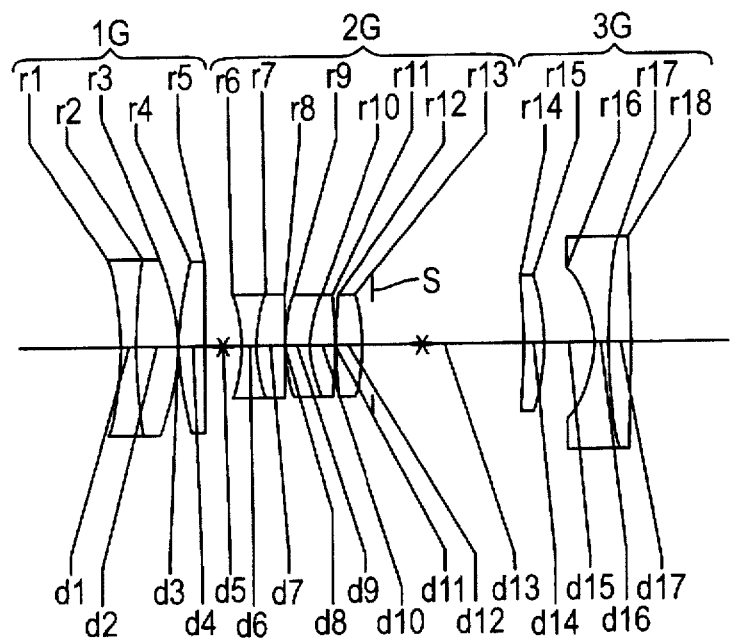
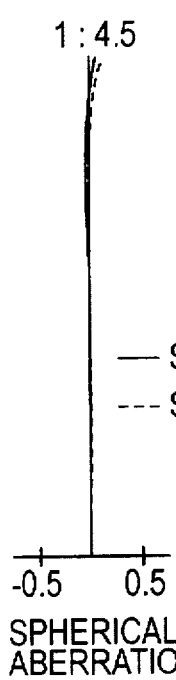
FIG. 6A
1 : 4.5
-0.5    0.5
SPHERICAL
ABERRATION
SINE CONDITION
—— SA
- - - SC
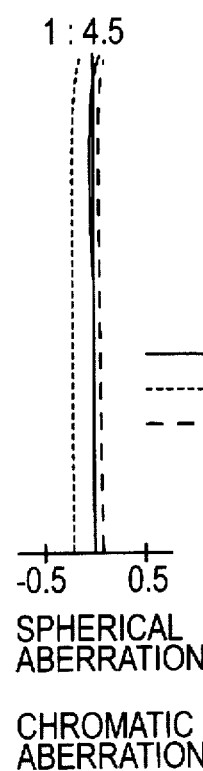
FIG. 6B
1 : 4.5
-0.5    0.5
SPHERICAL
ABERRATION
CHROMATIC
ABERRATION
—— d LINE
······ g LINE
- - - c LINE
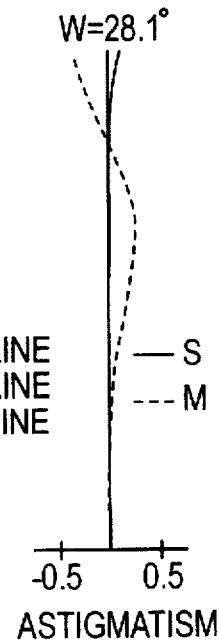
FIG. 6C
W=28.1°
-0.5    0.5
ASTIGMATISM
—— S
- - - M
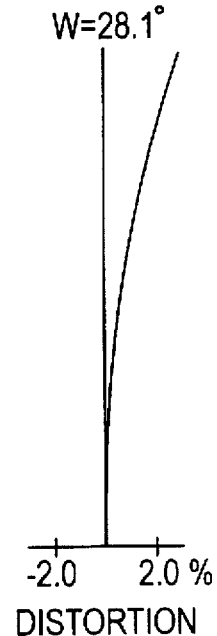
FIG. 6D
W=28.1°
-2.0    2.0 %
DISTORTION

1:9.3
— SA
--- SC
-0.5  0.5
SPHERICAL
ABERRATION

SINE CONDITION

1:9.3
— d LINE
······ g LINE
– – – c LINE
-0.5  0.5
SPHERICAL
ABERRATION

CHROMATIC
ABERRATION

W=11.5°
— S
--- M
-0.5  0.5
ASTIGMATISM

W=11.5°
-2.0  2.0 %
DISTORTION

1:12.5
— SA
--- SC
-0.5  0.5
SPHERICAL
ABERRATION

SINE CONDITION

1:12.5
— d LINE
······ g LINE
– – – c LINE
-0.5  0.5
SPHERICAL
ABERRATION

CHROMATIC
ABERRATION

W=7.6°
— S
--- M
-0.5  0.5
ASTIGMATISM

W=7.6°
-2.0  2.0 %
DISTORTION

FIG. 9
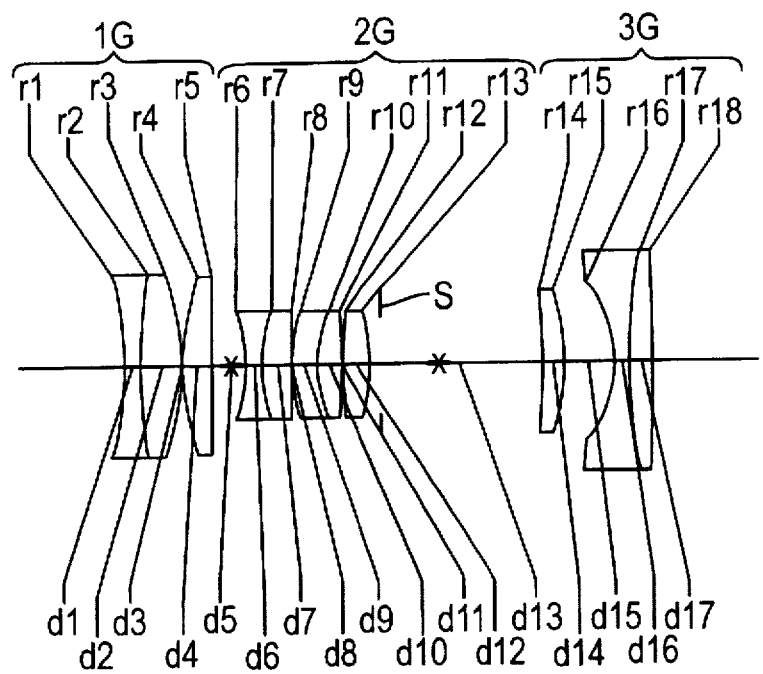
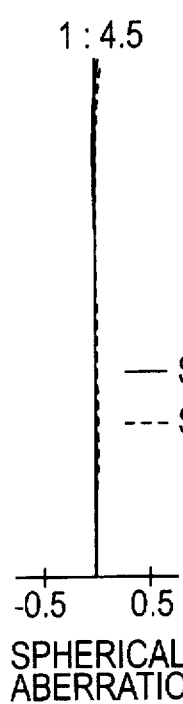
FIG. 10A
1:4.5
— SA
--- SC
-0.5    0.5
SPHERICAL
ABERRATION
SINE CONDITION
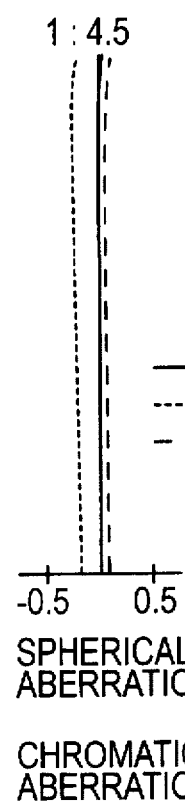
FIG. 10B
1:4.5
—— d LINE
······ g LINE
— — c LINE
-0.5    0.5
SPHERICAL
ABERRATION
CHROMATIC
ABERRATION
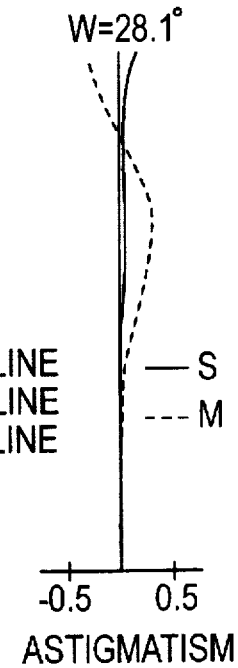
FIG. 10C
W=28.1°
— S
--- M
-0.5    0.5
ASTIGMATISM
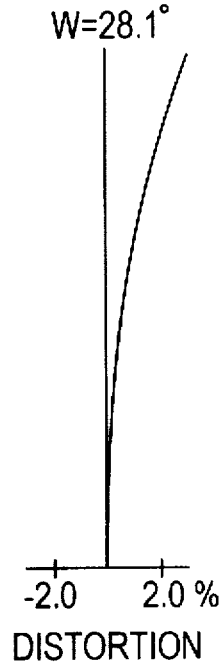
FIG. 10D
W=28.1°
-2.0    2.0 %
DISTORTION

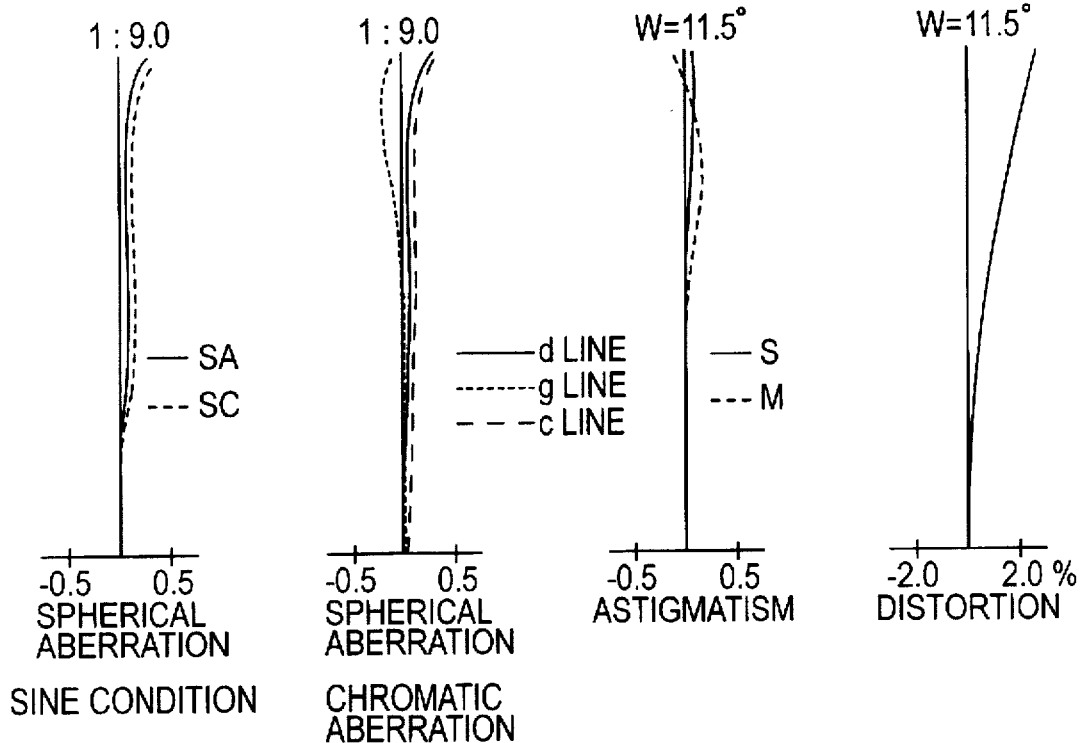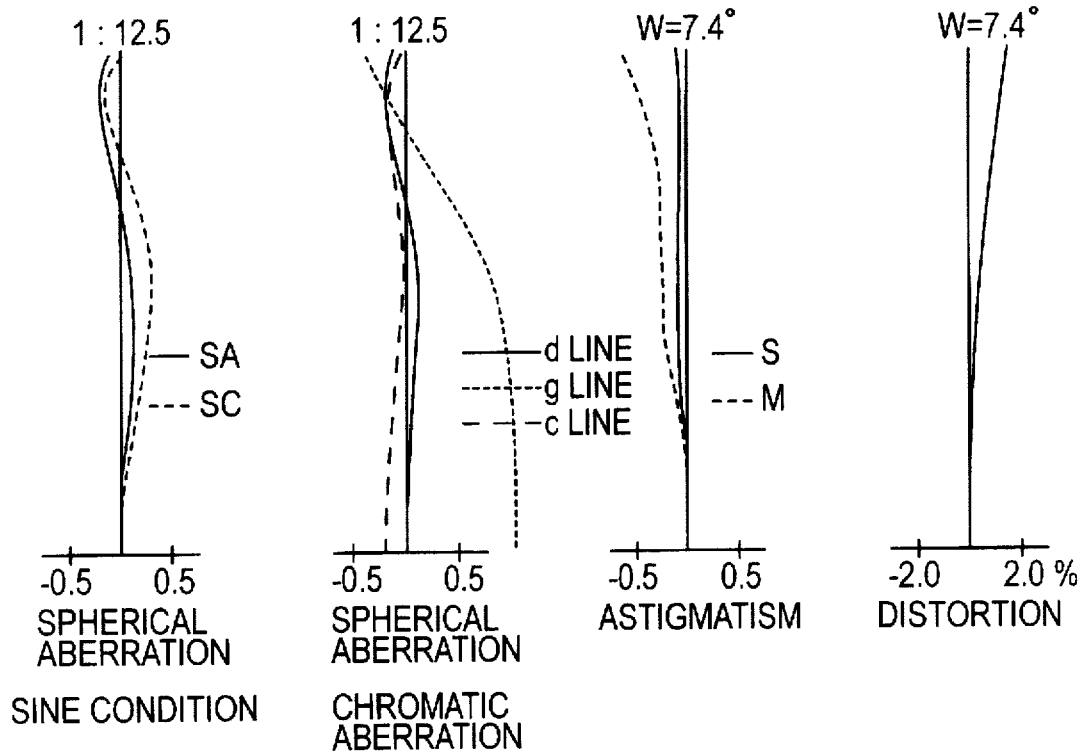

1 : 4.5

-0.5   0.5
SPHERICAL
ABERRATION

SINE CONDITION

— SA
--- SC

1 : 4.5

-0.5   0.5
SPHERICAL
ABERRATION

CHROMATIC
ABERRATION

—— d LINE
······ g LINE
– – c LINE

W=28.1°

-0.5   0.5
ASTIGMATISM

— S
--- M

W=28.1°

-2.0   2.0 %
DISTORTION

1 : 9.3

-0.5　0.5
SPHERICAL
ABERRATION

SINE CONDITION

— SA
--- SC

1 : 9.3

-0.5　0.5
SPHERICAL
ABERRATION

CHROMATIC
ABERRATION

— d LINE
---- g LINE
— — c LINE

W=11.5°

-0.5　0.5
ASTIGMATISM

— S
--- M

W=11.5°

-2.0　2.0 %
DISTORTION

1 : 12.5

-0.5　0.5
SPHERICAL
ABERRATION

SINE CONDITION

— SA
--- SC

1 : 12.5

-0.5　0.5
SPHERICAL
ABERRATION

CHROMATIC
ABERRATION

— d LINE
---- g LINE
— — c LINE

W=7.8°

-0.5　0.5
ASTIGMATISM

— S
--- M

W=7.8°

-2.0　2.0 %
DISTORTION

1:4.5

— SA
--- SC

SPHERICAL
ABERRATION

SINE CONDITION

1:4.5

— d LINE
····· g LINE
--- c LINE

SPHERICAL
ABERRATION

CHROMATIC
ABERRATION

W=28.2°

— S
--- M

ASTIGMATISM

W=28.2°

DISTORTION

FIG. 21
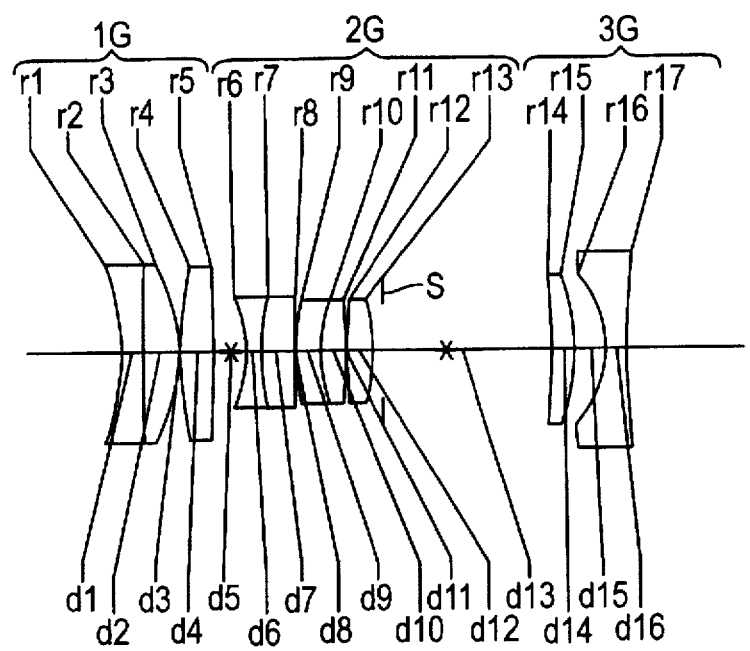
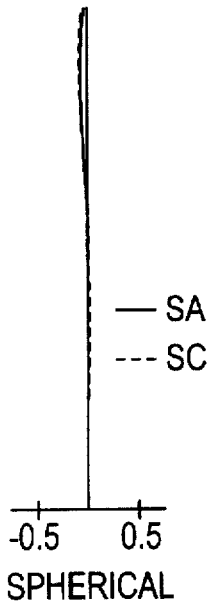
FIG. 22A
1 : 4.5
—— SA
--- SC
-0.5  0.5
SPHERICAL
ABERRATION
SINE CONDITION
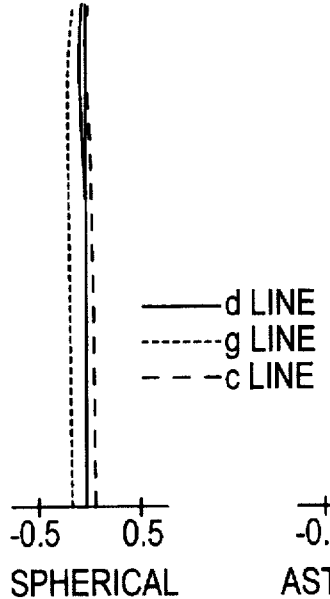
FIG. 22B
1 : 4.5
—— d LINE
······ g LINE
– – c LINE
-0.5  0.5
SPHERICAL
ABERRATION
CHROMATIC
ABERRATION
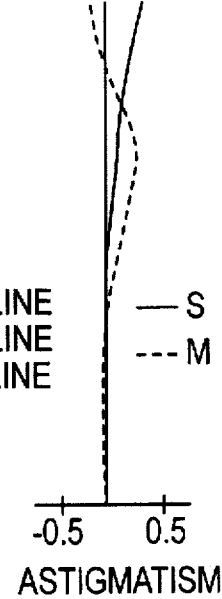
FIG. 22C
W=28.2°
—— S
--- M
-0.5  0.5
ASTIGMATISM
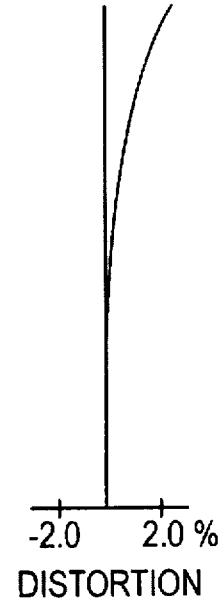
FIG. 22D
W=28.2°
-2.0  2.0 %
DISTORTION

1:9.3

SA
--- SC

-0.5   0.5
SPHERICAL
ABERRATION

SINE CONDITION

1:9.3

—— d LINE
----- g LINE
-- -- c LINE

-0.5   0.5
SPHERICAL
ABERRATION

CHROMATIC
ABERRATION

W=11.5°

—— S
--- M

-0.5   0.5
ASTIGMATISM

W=11.5°

-2.0   2.0 %
DISTORTION

1:12.5

—— SA
--- SC

-0.5   0.5
SPHERICAL
ABERRATION

SINE CONDITION

1:12.5

—— d LINE
----- g LINE
-- -- c LINE

-0.5   0.5
SPHERICAL
ABERRATION

CHROMATIC
ABERRATION

W=7.8°

—— S
-- - M

-0.5   0.5
ASTIGMATISM

W=7.8°

-2.0   2.0 %
DISTORTION

ZOOM LENS HAVING HIGH ZOOM RATIO

BACKGROUND OF THE INVENTION

1. Field of the Invention

The present invention relates to a zoom lens having a high zoom ratio, and in particular relates to a zoom lens for a compact camera having a small back focal distance. The present invention also relates to a small zoom lens having a zoom ratio of approximately 4 and in which chromatic aberrations are appropriately corrected.

2. Description of the Related Art

In a zoom lens having a high zoom ratio for a compact camera, as disclosed in U.S. Pat. No. 4,978,204 filed in the name of the assignee of the present application, it is unusual for the zoom ratio to be greater than 3. Recently, however, there has been a growing need for the provision of a zoom lens having a zoom ratio exceeding 3 and amounting to 4. However, if an attempt is made to miniaturize such a zoom lens having a high zoom ratio to thereby reduce the whole length of the zoom lens at the longest focal length, chromatic aberrations in opposite directions are produced on the short focal length side and the long focal length side. It is difficult to correct the chromatic aberrations throughout the entire focal length range.

SUMMARY OF THE INVENTION

It is an object of the present invention to provide a small zoom lens for a compact camera, having a zoom ratio of approximately 4 or more, in which the chromatic aberrations can be corrected throughout the entire focal length range.

According to the present invention, there is provided a zoom lens having a high zoom ratio, including at least three lens groups of a first lens group having positive power, a second lens group having positive power, and a third lens group having negative power, in this order from an object side. All of the three lens groups are moved toward the object side during a zooming operation from a short focal length position toward a long focal length position. The first lens group consists of a negative first lens element, a positive second lens element and a positive third lens element in this order from the object side and satisfies the following relationships (1) through (4):

(1) $4.3 < m_{3T} < 6$ (2) $1.7 < f_T/f_{1G} < 3$ (3) $31 < v_1 < 55$ (4) $0 < v_2 - v_1 < 30$ wherein $m_{3T}$ represents lateral magnification of the third lens group at the longest focal length position, $f_T$ represents the focal length of the entire lens system at the longest focal length position, $f_{1G}$ represents the focal length of the first lens group, $v_1$ represents the Abbe number of the negative first lens element of the first lens group, and $v_2$ represents the Abbe number of the positive second lens element of the first lens group.

Preferably, the zoom lens satisfies the following relationship 5:

(5) $-0.5 < f_w/f_{12} < 0$ wherein $f_w$ represents the focal length of the entire lens system at the shortest focal length position, and $f_{12}$ represents the resultant focal length of the first and second lens elements of the first lens group.

The first and second lens elements of the first lens group are preferably cemented to each other.

It is also preferable that the zoom lens satisfies the following relationships (6) and (7):

(6) $3.5 < f_T/f_{2G} < 5.0$ (7) $0.05 < \Sigma d_{2G}/f_T < 0.1$ wherein $f_{2G}$ represents the focal length of the second lens group, and $\Sigma d_{2G}$ represents the distance between the first surface of the second lens group and the last surface thereof.

In an embodiment of the present invention, the positive second lens group which satisfies relationships (6) and (7) consists of at least two cemented lens element units consisting of a first cemented lens element unit of negative power and a second cemented lens element unit of positive power in this order from the object side. Each of the cemented lens element units is made of cemented negative and positive lens elements and satisfies the following relationships (8) through (10):

(8) $8 < f_T/|f_{2Gn}| < 11$ (9) $v_{2n-N} > v_{2n-P}$

(10) $v_{2p-N} < v_{2p-P}$ wherein $f_{2Gn}$ represents the focal length of the first cemented lens element unit of negative power belonging to the second lens group, $v_{2n-N}$ represents the Abbe number of the negative lens element of the first cemented lens element unit of negative power belonging to the second lens group, $v_{2n-P}$ represents the Abbe number of the positive lens element of the first cemented lens element unit of negative power belonging to the second lens group, $v_{2p-N}$ represents the Abbe number of the negative lens element of the second cemented lens element unit of positive power belonging to the second lens group, and $v_{2p-P}$ represents the Abbe number of the positive lens element of the second cemented lens element unit of positive power belonging to the second lens group.

The third lens group of negative power can consist of a positive lens element and a cemented lens element unit of negative power, in this order from the object side. The cemented lens element unit is made of cemented negative and positive lens elements and satisfies the following relationships (11) and (12):

(11) $5 < f_{T/f_{3G}}| < 8.5$ ($f_{3G} < 0$)

(12) $v_{3N} > v_{3P}$ wherein $f_{3G}$ represents the focal length of the third lens group, $v_{3N}$ represents the Abbe number of the negative lens element of the cemented lens element unit of the third lens group, and $v_{3P}$ represents the Abbe number of the positive lens element of the cemented lens element unit of the third lens group.

According to another aspect of the present invention, there is provided a zoom lens of high zoom ratio, consisting of a first lens group having positive power, a second lens group having positive power, and a third lens group having negative power, in this order from an object side. All of the three lens groups are moved toward the object side during a zooming operation from a short focal length position toward a long focal length position. The positive first lens group consists of at least one cemented lens element unit. The positive second lens group consists of at least two cemented lens element units, so that there are at least three cemented lens element units as a whole. The zoom lens satisfies the following relationship (1):

(1) $4.3 < m_{3T} < 6$ wherein $m_{3T}$ represents lateral magnification of the third lens group at the longest focal length position.

Preferably, the zoom lens satisfies the following relationship (17):

(17) $60 < v'_{3N}$ wherein $v'^{3N}$ represents the Abbe number of the negative lens element of the third lens group.

According to another aspect of the present invention, there is provided a zoom lens having a high zoom ratio consisting of a first lens group having positive power, a second lens group having positive power, and a third lens group having negative power, in this order from an object side. All of the three lens groups are moved toward the object side during a zooming operation from a short focal length position toward a long focal length position. The positive first lens group consists of at least one cemented lens element unit, the positive second lens group consists of at least two cemented lens element units, the negative third lens group consists of at least one cemented lens element unit, so that there are at least four cemented lens element units.

Also in this aspect, the zoom lens preferably satisfies the above-mentioned relationship (1).

The present disclosure relates to subject matter contained in Japanese Patent Application No. 7-278026 (filed on Oct. 25, 1995) which is expressly incorporated herein by reference in its entirety.

BRIEF DESCRIPTION OF THE DRAWINGS

The invention will be described below in detail with reference to the attached drawings, in which similar elements are indicated by similar reference numerals, and wherein:

FIG. 5 is a schematic view of a lens arrangement of a zoom lens system having a high zoom ratio, according to a second embodiment of the present invention;

FIGS. 6A, 6B, 6C and 6D are aberration diagrams of the lens system shown in FIG. 5, at a shortest focal length;

FIG. 9 is a schematic view of a lens arrangement of a zoom lens system having a high zoom ratio, according to a third embodiment of the present invention;

FIG. 10A, 10B, 10C and 10D are aberration diagrams of the lens system shown in FIG. 9, at a shortest focal length;

FIGS. 11A, 11B, 11C and 11D are aberration diagrams of the lens system shown in FIG. 9, at an intermediate focal length;

FIGS. 12A, 12B, 12C and 12D are aberration diagrams of the lens system shown in FIG. 9, at a longest focal length;

FIG. 21 is a schematic view of a lens arrangement of a zoom lens system having a high zoom ratio, according to a sixth embodiment of the present invention;

FIGS. 22A, 22B, 22C and 22D are aberration diagrams of the lens system shown in FIG. 21, at a shortest focal length;

DESCRIPTION OF THE PREFERRED EMBODIMENTS

Figure 1:
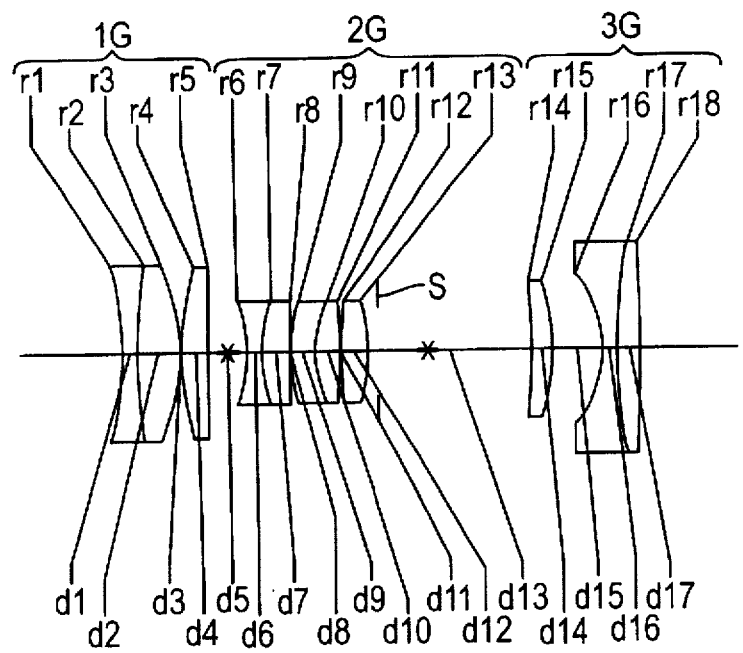
FIG. 1 is a schematic view of a lens arrangement of a zoom lens system having a high zoom ratio, according to a first embodiment of the present invention.
Figure 2A:
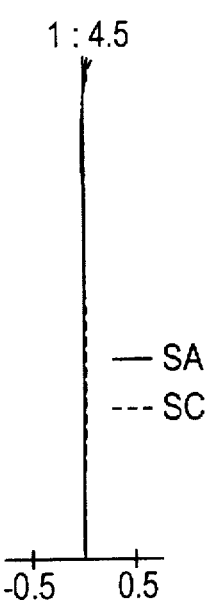
FIGS. 2A, 2B, 2C and 2D are aberration diagrams of the lens system shown in FIG. 1, at a shortest focal length.
Figure 2B:
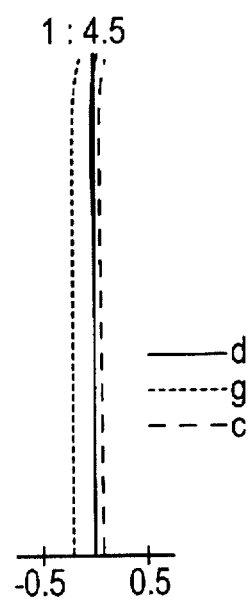
Figure 2C:
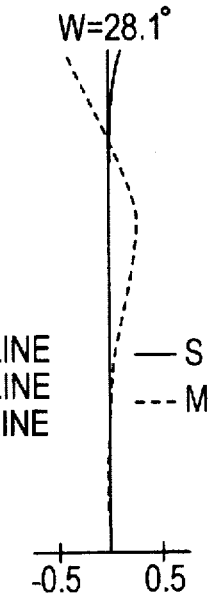
Figure 2D:
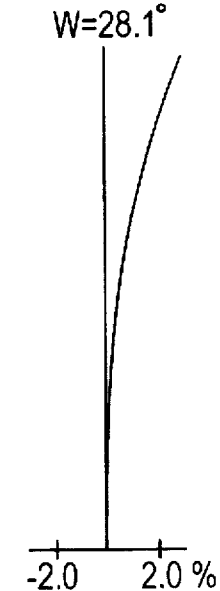
Figure 3A:
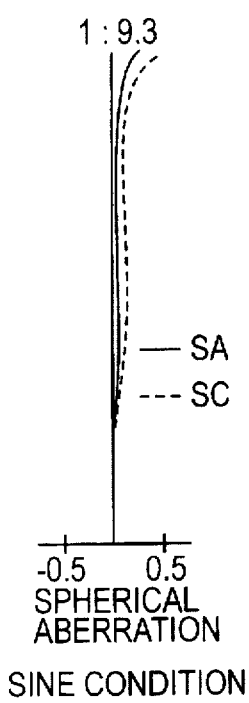
FIGS. 3A, 3B, 3C and 3D are aberration diagrams of the lens system shown in FIG. 1, at an intermediate focal length.
Figure 3B:
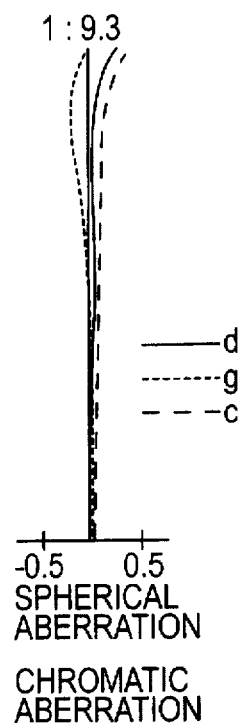
Figure 3C:
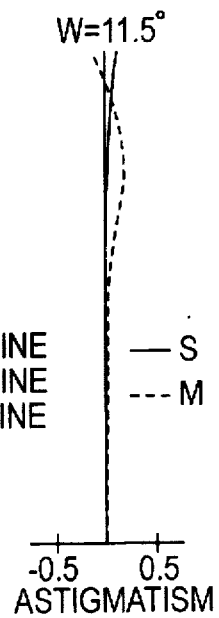
Figure 3D:
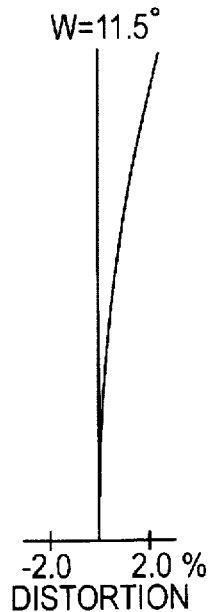
Figure 4A:
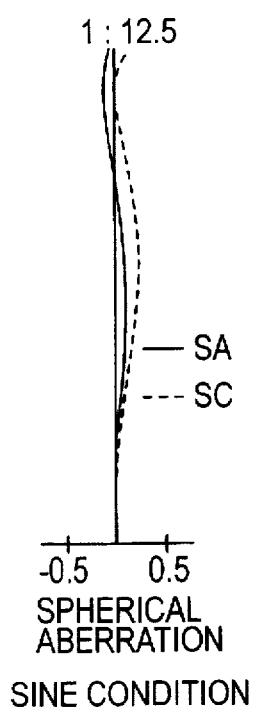
FIGS. 4A, 4B, 4C and 4D are aberration diagrams of the lens system shown in FIG. 1, at a longest focal length.
Figures 4B, 4C:
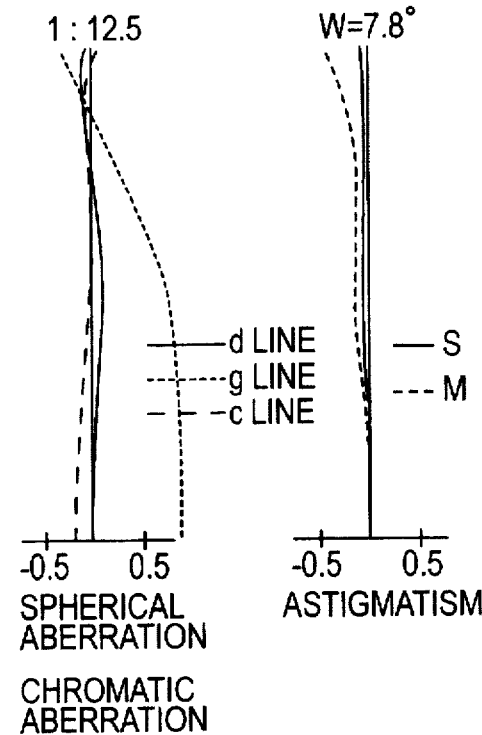
Figure 4D:
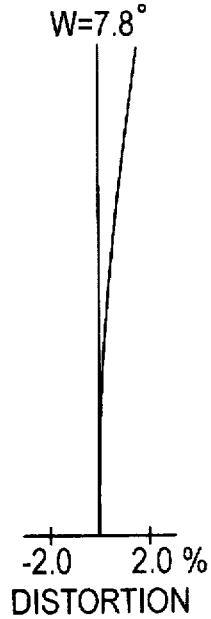
Figure 7A:
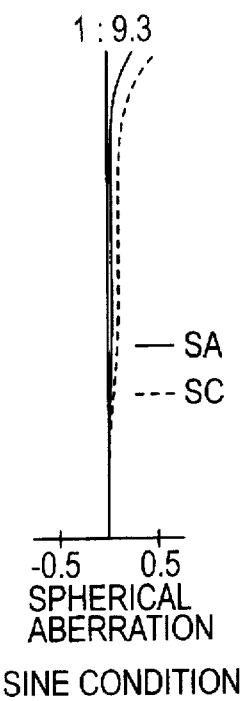
FIGS. 7A, 7B, 7C and 7D are aberration diagrams of the lens system shown in FIG. 5, at an intermediate focal length.
Figure 7B:
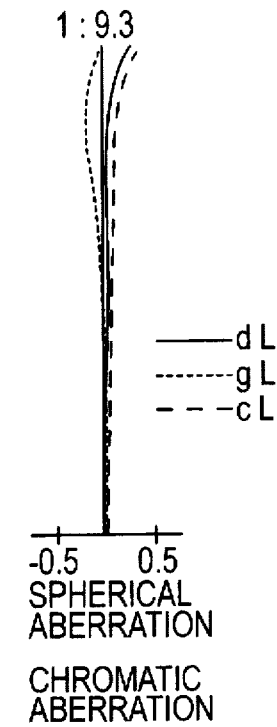
Figure 7C:
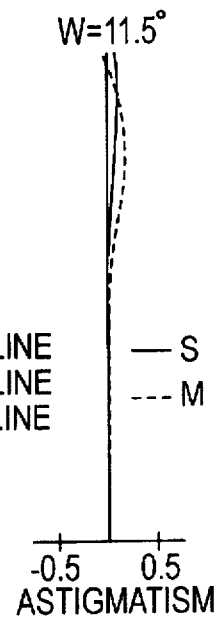
Figure 7D:
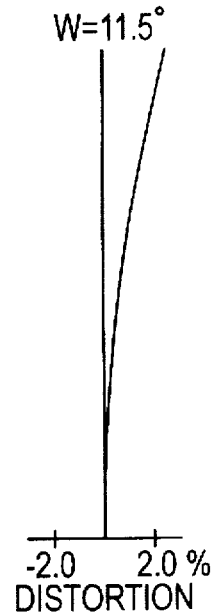
Figure 8A:
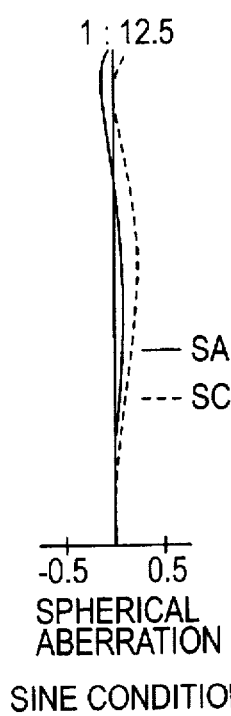
FIGS. 8A, 8B, 8C and 8D are aberration diagrams of the lens system shown in FIG. 5, at a longest focal length.
Figure 8B:
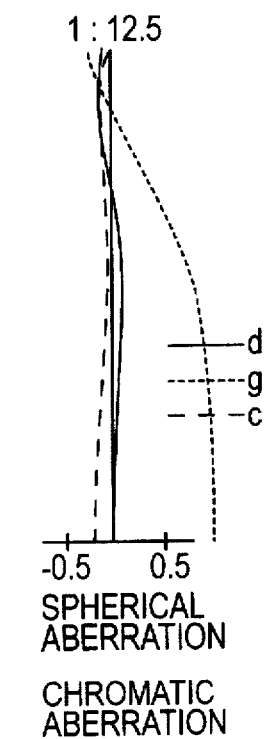
Figure 8C:
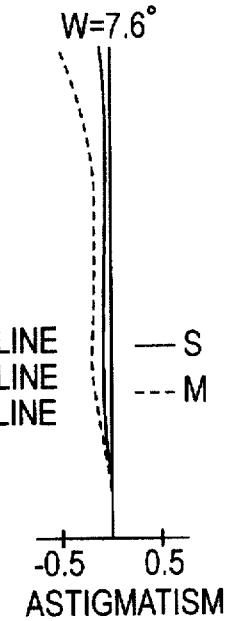
Figure 8D:
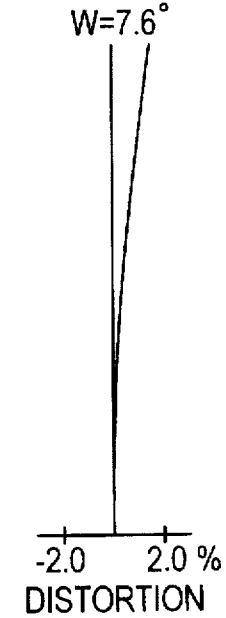

A zoom lens according to the present invention consists of at least three lens groups, i.e., a positive first lens group, a positive second lens group and a 15 negative third lens group, arranged in this order from an object side (the left hand side of FIGS. 1, 5, 9, 13, 17, and 21). With this lens arrangement it is possible to not only obtain a high zoom ratio while miniaturizing the zoom lens, but also to reduce the movement of the lens groups.

In particular, the first lens group consists of three lens elements, namely, a negative lens element and two positive lens elements, arranged in this order from the object side. Owing to the arrangement of the three lens elements, not only can various aberrations be corrected, but it is also possible to provide a first lens group having a relatively large positive power (compared with a conventional zoom lens of similar type), in order to reduce the movement of the lens groups during a zooming operation. This results in the of a small zoom lens.

Relationship (1) specifies the lateral magnification of the negative third lens group at the longest focal length, to obtain a high zoom ratio which is approximately 4 or more. If the lateral magnification defined in relationship (1) is less than the lower limit, it is necessary to increase the movement of the second and third lens groups in order to obtain a zoom ratio approximately identical to 4, contrary to the miniaturization of the zoom lens. If the lateral magnification is greater than the upper limit defined in relationship (1), the power of the negative third lens group is too large to restrict the fluctuation of the aberrations. Moreover, the structure of the third lens group is complicated. Furthermore, the power of the positive second lens group must be increased, thus leading the complexity of the structure of the second lens group. A complex lens structure increases the possibility of poor optical performance due to manufacturing error.

Relationship (2) relates to the focal length of the first lens group. If the ratio defined in relationship (2) is less than the lower limit, the power of the first lens group is so small that the movement of the lens groups becomes too large. If the ratio is greater than the upper limit defined in relationship (2), the power of the first lens group is too large to correct the aberrations produced in the first lens group. Namely, a distortion occurs in the positive direction on the short focal length side, and the spherical aberration occurs in the negative direction on the long focal length side. Moreover, the optical performance degrades due to an assembly error.

Relationships (3) and (4) specify the requirements to correct the chromatic aberrations produced in the first lens group. The first lens group has a positive power as a whole. In general in the prior art, the negative lens element is made of a high-dispersion glass material whose Abbe number is less than the lower limit defined in relationship (3), and the positive lens is made of a low-dispersion glass material. In the prior art, if an attempt is made to obtain a zoom ratio of approximately 4 or more, no chromatic aberration can be effectively corrected on the short focal length side, and an over correction of the chromatic aberration occurs on the long focal length side. Contrary to this, in the present invention, in order to reduce the diameter of the lens positioned nearest to the object side, a negative lens element of strong power is positioned on the object side, as can be understood from relationship (2). In addition thereto, the negative lens element of the first lens group is made of a glass material having an intermediate dispersibility (less than that in the prior art), i.e., the value of $v$ is slightly greater than that in the prior art as defined in relationship (3).

Preferably, to more effectively correct the spherical and comatic aberrations within the first lens group, the negative first lens element and the positive second lens element are made of a high refractive index glass and a low refractive index glass, respectively, so as to meet the requirements specified in relationships (13) and (14):

(13) $1.7 < n_1$

(14) $0.15 < n_1 - n_2$ wherein "$n_1$" represents the refractive index of the negative first lens element of the first lens group and "$n_2$" represents the refractive index of the positive second lens element of the first lens group.

If the ratio is less than the lower limit defined in relationship (3) or greater than the upper limit defined in relationship (4), no chromatic aberration produced in the first lens group can be satisfactorily corrected on the short focal length side, and an over correction thereof occurs on the long focal length side. This leads to an increase in the amount of aberrations.

Conversely, if the ratio is greater than the upper limit defined in relationship (3) or less than the lower limit defined in relationship (4), no chromatic aberration produced in the first lens group can be satisfactorily corrected.

In the present invention, since the first lens group as a whole has a positive power, from the viewpoint of the correction of the aberrations, it is preferable that a plurality of lens elements share the positive power. Namely, in theory, from the viewpoint of the aberration correction, it is preferable that the resultant focal length $f_{12}$ of the first and second lens elements of the first lens group is a "positive" value. However, if the resultant focal length is positive, paraxial rays tend to impinge upon the second lens group at low incident points at a focal length between the intermediate focal length and the longest focal length, thus resulting in a small back focal distance. This increases the lens diameter of the third lens group. Accordingly, it is advisable that the resultant focal length $f_{12}$ of the first and second lens elements has a slight negative power. Consequently, the distortion which is resultantly positive can be effectively restricted. Preferably, the resultant negative power of the first and second lens elements satisfies relationship (5).

Relationship (5) defines the resultant power of the first and second lens elements of the first lens group. If the ratio is less than the lower limit defined in relationship (5), the negative power of the resultant focal length $f_{12}$ is too strong. Consequently, the positive power of the third lens element must be increased, which results in an optical performance degradation due to an assembly error, such as decentering or deviation of the lens elements, etc.

If the ratio is greater than the upper limit defined in relationship (5), the back focal distance of the whole lens system is so short that the diameter of the first lens group is too large, contrary to the need for miniaturization of the zoom lens. Hence, positive distortion cannot be satisfactorily corrected.

Preferably, the first surface of the first lens element of the first lens group is a concave surface. Thus, not only can the astigmatism and the distortion be easily corrected, but also the effect to reduce the lens diameter of the first lens group can be enhanced. Moreover, the end surface (last surface) of the first lens group located on the image surface side can be a convex surface. With this arrangement, not only can the holding mechanism of the lens groups be simplified but also the distance between the first lens group and the second lens group, upon close photographing at the shortest focal length, can be decreased. This results in a reduction in the size of the zoom lens in the optical axis direction.

The radius of curvature of the first surface of the first lens element preferably satisfies relationship (15):

(15) $-1.5 < r_1/f_w < -0.5$ wherein "$r_1$" represents the radius of curvature of the first surface of the first lens element.

If the ratio is less than the lower limit defined in relationship (15), the dispersiveness is too small to fulfill the effects mentioned above. Conversely, if the ratio is greater than the upper limit, the curvature is so large that an over correction of astigmatism and distortion occurs. Hence, the aberrations fluctuate considerable in accordance with the change in the image height.

If the first and second lens elements are cemented to each other (a cemented lens element unit), no deterioration of the optical performance due to a manufacturing error, etc., occurs.

Relationship (6) defines the power of the second lens group. If the ratio defined in relationship (6) is greater than the upper limit, the power of the second lens group is so weak that light impinges upon the third lens group at a low incident point. This results in an increase in the back focal distance of the whole lens system, contrary to a miniaturization of the zoom lens. Moreover, the movement of the second lens group during the zooming operation is increased, such that the length of the entire lens system at the longest focal length position is increased. If the ratio exceeds the upper limit defined in relationship (6), the power of the second lens group is too strong to correct the aberrations produced in the second lens group. Furthermore, the incident point at which light impinges upon the third lens group is low, and hence the back focal distance at the shortest focal length position is so short that the diameter of the third lens group becomes too large.

Relationship (7) defines the requirement on the thickness of the second lens group. If the ratio defined in relationship (7) is smaller than the lower limit, the power of the lens elements of the second lens group is too strong to correct the spherical and comatic aberrations. Moreover, the optical performance can easily deteriorate due to a manufacturing error, such as a decentering or deviation, etc., and the aberrations tend to fluctuate easily during the zooming operation. If the ratio exceeds the upper limit defined in relationship (7), the thickness of the second lens group increases contrary to the need for miniaturization.

The second lens group of the zoom lens preferably consists of at least two cemented lens element units, i.e., a first cemented lens element unit of negative power and a second cemented lens element unit of positive power, arranged in this order from the object side. Namely, the lens arrangement including a negative first lens group 2Gn and a positive second lens group 2Gp, makes it possible not only to reduce the lens diameter of the second lens group on the object side, but also to obtain an optimal back focal distance at the shortest focal length position.

Preferably, the negative lens group 2Gn has a power which meets the requirement defined by relationship (8). If the ratio is smaller than the lower limit defined in relationship (8), the power of the negative lens group 2Gn is so weak that the incident point at which light is made incident upon the third lens group is low, and hence the back focal distance at the shortest focal length position becomes too short and the diameter of the third lens group is increased.

If the ratio is above the upper limit defined in relationship (8), the power of the negative lens group 2Gn is so strong that the incident point at which light is made incident upon the third lens group is high. Hence, the back focal distance of the whole lens system is increased. Consequently, no miniaturization of the zoom lens can be achieved. Moreover, at the longest focal length position, neither longitudinal (axial) chromatic aberration nor positive spherical aberration can be effectively corrected; and, at the shortest focal length position, no positive distortion can be corrected.

The positive lens group 2Gp is adapted to correct the spherical and comatic aberrations produced in the negative lens group 2Gn, to thereby ensure that the second lens group has a positive power as a whole. It is preferable that in addition to the negative lens group 2Gn, the positive lens group 2Gp is also made of a cemented lens element unit to correct the chromatic aberration, and in particular the axial chromatic aberration.

Relationships (9) and (10) specify the requirements to correct the chromatic aberrations of the cemented lens element units of the second lens group. Preferably, the cemented lens element unit of the second lens group having negative power, that is located on the object side, consists (1) of a negative lens element, made of a low-dispersion glass material to share the negative power, and (2) a positive lens element of a weak positive power, made of a high-dispersion glass material to correct the chromatic aberration produced by the negative lens element, as specified in relationship (9).

On the other hand, in the cemented lens element unit having a positive power, it is preferable that the positive lens element which shares the power be made of a low-dispersion glass material and the negative lens element which is adapted to correct the chromatic aberration be made of a high-dispersion glass material.

Due to the lens arrangement including the cemented lens element units, not only can the chromatic aberration be corrected, but also no deterioration of the optical performance occur due to a manufacturing error, such as decentering or deviation of the lenses, etc.

Preferably, the lens group 2Gn of the second lens group consists of a negative lens group and a positive lens group, arranged in this order from the object side. The surface of the lens group 2Gn that is located closest to the object side is preferably a concave surface. Consequently, light is diverged by the concave surface on the object side, so that the diameter of the lens group 2Gn is reduced. Furthermore, the lens group 2Gn preferably satisfies the relationship (16):

(16) $-1 < r_2 Gn_1/f_w < -0.25$ wherein "$r_2 Gn_1$" represents the radius of curvature of the surface of the second lens group that is located closest to the object.

If the ratio is below the lower limit defined in relationship (16), the dispersiveness is so small that the diameter of the lens group 2Gn cannot be decreased. If the ratio is above the upper limit, the dispersiveness is so large that the diameter of the lens group 2Gn is increased and the curvature is too large to produce the lens surface of $r_2 Gn_1$.

If the lens group 2Gn consists of the negative lens element and the positive lens element in this order from the object side, the positive distortion produced in the third lens group (negative lens group) on the short focal length side can be corrected.

The negative third lens group of the zoom lens according to the present invention preferably consist of a positive lens element and a cemented lens element unit having a negative power as a whole, arranged in this order from the object side. The cemented lens element unit consists of a positive lens element and a negative lens element cemented thereto in this order from the object side.

Relationship (11) specifies the requirement to restrict the power of the negative third lens group. If the third lens group meets the requirement specified by relationship (11), not only can the fluctuation of the aberrations during the zooming operation be practically negligible, but also a high zoom ratio can be obtained without remarkably increasing the movement of the negative lens group. If the ratio is below the lower limit defined in relationship (11), the negative power of the third lens group is too weak. If the negative power of the third lens group is weak, there is little fluctuation of aberrations during the zooming operation, but the movement of the lens groups is increased and the mechanism for moving the lens groups is complicated. Also, the back focal distance at the shortest focal length becomes too short and the diameter of the negative lens group is increased. In addition to the foregoing, the whole lens length at the longest focal length position is increased contrary to the miniaturization of the zoom lens.

If the ratio defined in relationship (11) is above the upper limit, the negative power of the third lens group is too strong and the fluctuation of aberrations during the zooming operation is enhanced. Namely, it is difficult to appropriately correct the spherical and comatic aberrations throughout the entire focal length range.

Relationship (12) specifies the requirement to correct the chromatic aberration of the third lens group. The third lens group, which is a negative lens group, preferably consists of a cemented lens element unit having a negative power to correct the chromatic aberrations produced within the negative lens group. Since the cemented lens element unit has a strong negative power, the negative lens element thereof preferably is made of a low-dispersion glass material to share the negative power, and the positive lens element cemented to the negative lens element is made of a high-dispersion glass material to correct the chromatic aberrations produced by the negative lens element. This meets the requirement specified in relationship (12). In particular, the lateral chromatic aberration on the short focal length side and the longitudinal chromatic aberration on the long focal length side can be corrected in a well-balanced state.

Note that the third lens group can consist of a non-cemented lens element (negative lens element). In this case, the negative lens element is preferably made of a low-dispersion glass material which meets the requirement specified by relationship (17):

(17) $60 < v'_{3N}$ wherein "$v'_{3N}$" represents the Abbe number of the non-cemented negative lens element of the third lens group.

Numerical examples (Embodiments 1 through 6) of the present invention will be discussed below.

In the first through sixth embodiments, the basic structure of the lens system consists of a positive first lens group 1G, a positive second lens group 2G, a stop (diaphragm) S, and a negative third lens group 3G, arranged in this order from the object side. The stop S is moved together with the second lens group 2G. In all the embodiments, the positive first lens group 1G consists of a negative lens element, a positive lens element, and a positive lens element arranged in this order from the object side. The negative lens element is cemented to the positive lens element on the object side.

In all the embodiments, the second lens group 2G consists of a cemented lens element unit of negative power, consisting of a negative lens element and a positive lens element cemented thereto, a cemented lens element unit of positive power, consisting of a negative lens element and a positive lens element cemented thereto, and a positive lens element. The lens elements mentioned above are arranged in this order from the object side.

In embodiments 1-3, the third lens group 3G consists of a positive lens element and a cemented lens element unit of negative power consisting of a negative lens element and a positive lens element cemented thereto, arranged in this order from the object side. In embodiments 4-6, group 3G consists of a positive lens element and a negative lens element arranged in this order from the object side.

In the following tables and drawings, "$F_{NO}$" represents the F-number, "f" represents the focal length of the entire optical system, "W" represents the half angle of view, "$f_B$" represents the back focal distance, "R" represents the radius of curvature, "D" represents the thickness of a lens or the distance between lenses, "Nd" represents the refractive index of the d-line, and "$v_d$" represents the Abbe number of the d-line. In the aberration diagrams, "SA" represents the spherical aberration, "SC" represents the sine condition, "d-line", "g-line", and "C-line" the chromatic aberrations represented by the spherical aberrations at the respective wavelengths, "S" represents the sagittal astigmatism, and "M" represents the meridional astigmatism.

The shape of an aspherical surface can be generally expressed as follows:

$$x = Ch^2/\{1+[-(1-(1+K)C^2h^2)^{1/2}]\}+A4h^4+A6h^6+A8h^8+\ldots$$

wherein,

"h" represents a height above the axis;

"x" represents a distance from a tangent plane of an aspherical vertex;

"C" represents a curvature of the aspherical vertex(1/r);

"K" represents a conic constant;

"A4" represents a fourth-order aspherical factor;

"A6" represents a sixth-order aspherical factor;

"A8" represents an eighth-order aspherical factor;

"A10" represents a tenth-order aspherical factor; and,

"A12" represents a twelfth-order aspherical factor.

Embodiment 1

FIG. 1 shows a first embodiment of an optical system of a zoom lens having a high zoom ratio according to the present invention. FIGS. 2A through 2D, 3A through 3D, and 4A through 4D are diagrams showing various aberrations at a shortest focal length, an intermediate focal length and a longest focal length, respectively. Numerical data regarding the lens system of the first embodiment is shown in Table 1 below.

TABLE 1

$F_{NO} = 1:4.5-9.3-12.5$
$f = 39.30-103.99-155.03$
$W = 28.1-11.5-7.8$
$f_B = 9.48-51.20-80.97$

| Surface No. | R | d | $N_d$ | $v_d$ |
|---|---|---|---|---|
| 1 | −33.250 | 1.50 | 1.74320 | 49.3 |
| 2 | 51.818 | 4.45 | 1.48749 | 70.2 |
| 3 | −24.388 | 0.10 | — | — |
| 4 | 31.558 | 2.75 | 1.48749 | 70.2 |
| 5 | −615.329 | 3.78−20.36−26.15 | — | — |
| 6 | −15.318 | 1.50 | 1.83481 | 42.7 |
| 7 | 15.615 | 2.89 | 1.84666 | 23.8 |
| 8 | 110.104 | 0.10 | — | — |
| 9 | 21.365 | 2.60 | 1.84666 | 23.8 |
| 10 | 13.064 | 2.58 | 1.60311 | 60.7 |
| 11 | −44.360 | 0.10 | — | — |
| 12 | 68.934 | 2.73 | 1.58913 | 61.2 |
| 13 * | −18.182 | 1.00 | — | — |
| stop | ∞ | 16.14−5.27−2.30 | — | — |
| 14 * | −51.265 | 2.06 | 1.58547 | 29.9 |
| 15 | −27.117 | 5.30 | — | — |
| 16 | −13.550 | 1.50 | 1.80400 | 46.6 |
| 17 | 62.887 | 2.38 | 1.80518 | 25.4 |
| 18 | −273.833 | — | — | — |

*marked surface is rotationally, symmetrically aspherical.
Aspherical Data

No. 13: $K = 0.0$, $A4 = 0.53171 \times 10^{-4}$, $A6 = -0.49306 \times 10^{-7}$, $A8 = 0.12487 \times 10^{-8}$, $A10 = 0.0$, $A12 = 0.0$ No. 14: $K = 0.0$, $A4 = 0.32913 \times 10^{-4}$, $A6 = -0.55594 \times 10^{-7}$, $A8 = 0.15056 \times 10^{-8}$, $A10 = 0.0$, $A12 = 0.0$

Embodiment 2

FIG. 5 shows a second embodiment of an optical system of a zoom lens having a high zoom ratio according to the present invention. FIGS. 6A through 6D, 7A through 7D, and 8A through 8D are diagrams showing various aberrations at a shortest focal length, an intermediate focal length and a longest focal length, respectively. Numerical data regarding the second embodiment is shown in Table 2 below.

TABLE 2

$F_{NO} = 1:4.5-9.3-12.5$
$f = 39.30-104.01-160.05$
$W = 28.1-11.5-7.6$
$f_B = 9.35-50.02-81.97$

| Surface No. | R | d | $N_d$ | $v_d$ |
|---|---|---|---|---|
| 1 | −31.543 | 1.50 | 1.74320 | 49.3 |
| 2 | 51.477 | 4.39 | 1.48749 | 70.2 |
| 3 | −23.584 | 0.10 | — | — |
| 4 | 32.049 | 2.81 | 1.48749 | 70.2 |
| 5 | −307.465 | 3.55−20.85−27.02 | — | — |
| 6 | −15.120 | 1.50 | 1.83481 | 42.7 |
| 7 | 14.859 | 2.74 | 1.84666 | 23.8 |
| 8 | 106.935 | 0.10 | — | — |
| 9 | 21.309 | 2.60 | 1.84666 | 23.8 |
| 10 | 12.807 | 2.58 | 1.60311 | 60.7 |
| 11 | −37.380 | 0.10 | — | — |
| 12 | 81.734 | 2.71 | 1.58913 | 61.2 |
| 13 * | −18.383 | 1.00 | — | — |
| stop | ∞ | 16.38−5.51−2.30 | — | — |
| 14 * | −46.612 | 2.03 | 1.58547 | 29.9 |
| 15 | −26.197 | 5.33 | — | — |
| 16 | −13.550 | 1.50 | 1.80400 | 46.6 |

TABLE 2-continued $F_{NO} = 1:4.5-9.3-12.5$
$f = 39.30-104.01-160.05$
$W = 28.1-11.5-7.6$
$f_B = 9.35-50.02-81.97$

| Surface No. | R | d | $N_d$ | $v_d$ |
|---|---|---|---|---|
| 17 | 60.033 | 2.42 | 1.80518 | 25.4 |
| 18 | -275.447 | — | — | — |

*marked surface is rotationally, symmetrically aspherical.
Aspherical Data

No. 13: $K = 0.0, A4 = 0.49305 \times 10^{-4}, A6 = -0.40046 \times 10^{-7}$,
$A8 = 0.10096 \times 10^{-8}, A10 = 0.0, A12 = 0.0$ No. 14: $K = 0.0, A4 = 0.32289 \times 10^{-4}, A6 = -0.49356 \times 10^{-7}$,
$A8 = 0.14358 \times 10^{-8}, A10 = 0.0, A12 = 0.0$ Embodiment 3

FIG. 9 shows a third embodiment of an optical system of a zoom lens having a high zoom ratio according to the present invention. FIGS. 10A through 10D, 11A through 11D, and 12A through 12D are diagrams showing various aberrations at a shortest focal length, an intermediate focal length and a longest focal length, respectively. Numerical data regarding the third embodiment is shown in Table 3 below.

TABLE 3

$F_{NO} = 1:4.5-9.0-12.5$
$f = 39.30-103.95-165.00$
$W = 28.1-11.5-7.4$
$f_B = 9.24-48.32-82.80$

| Surface No. | R | d | $N_d$ | $v_d$ |
|---|---|---|---|---|
| 1 | -30.940 | 1.50 | 1.74320 | 49.3 |
| 2 | 50.847 | 4.31 | 1.48749 | 70.2 |
| 3 | -23.293 | 0.10 | — | — |
| 4 | 30.306 | 2.89 | 1.48749 | 70.2 |
| 5 | -324.945 | 3.55-21.02-26.71 | — | — |
| 6 | -15.058 | 1.50 | 1.83481 | 42.7 |
| 7 | 14.343 | 2.77 | 1.84666 | 23.8 |
| 8 | 93.709 | 0.10 | — | — |
| 9 | 20.854 | 2.60 | 1.84666 | 23.8 |
| 10 | 12.629 | 2.58 | 1.60311 | 60.7 |
| 11 | -34.566 | 0.10 | — | — |
| 12 | 89.002 | 2.70 | 1.58913 | 61.2 |
| 13 * | -18.497 | 1.00 | — | — |
| stop | ∞ | 16.39-5.63-2.30 | — | — |
| 14 * | -49.283 | 2.02 | 1.58547 | 29.9 |
| 15 | -27.261 | 5.03 | — | — |
| 16 | -13.550 | 1.50 | 1.80400 | 46.6 |
| 17 | 52.581 | 2.50 | 1.80518 | 25.4 |
| 18 | -374.546 | — | — | — |

*marked surface is rotationally, symmetrically aspherical.
Aspherical Data

No. 13: $K = 0.0, A4 = 0.50045 \times 10^{-4}, A6 = -0.53557 \times 10^{-7}$,
$A8 = 0.10787 \times 10^{-8}, A10 = 0.0, A12 = 0.0$ No. 14: $K = 0.0, A4 = 0.35233 \times 10^{-4}, A6 = -0.29181 \times 10^{-7}$,
$A8 = 0.97271 \times 10^{-9}, A10 = 0.0, A12 = 0.0$ Embodiment 4

Figure 13:
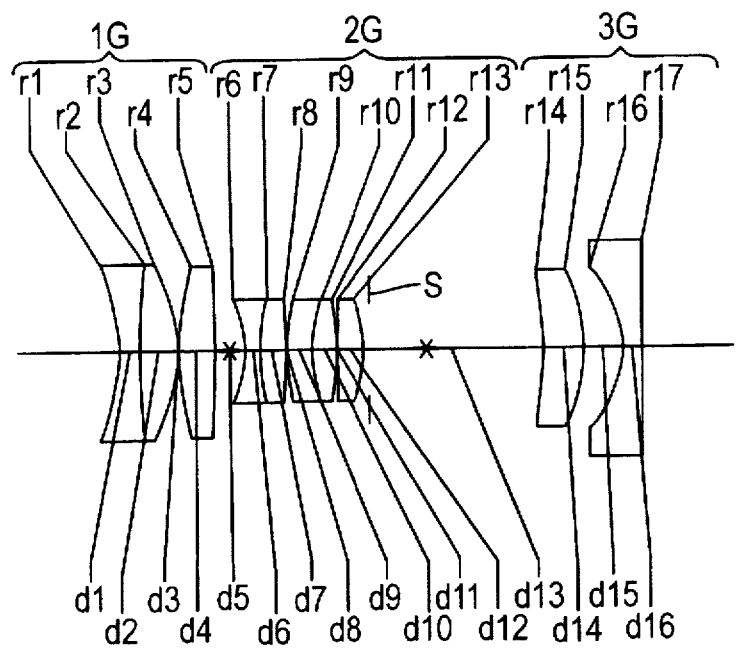
FIG. 13 is a schematic view of a lens arrangement of a zoom lens system having a high zoom ratio, according to a fourth embodiment of the present invention.
Figure 14A:
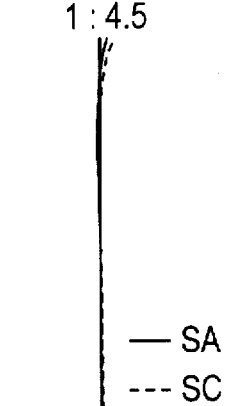
FIGS. 14A, 14B, 14C and 14D are aberration diagrams of the lens system shown in FIG. 13, at a shortest focal length.
Figure 14B:
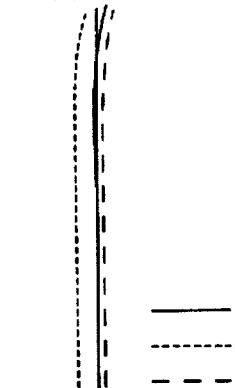
Figure 14C:
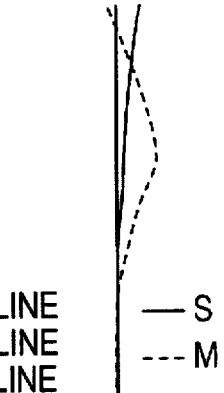
Figure 14D:
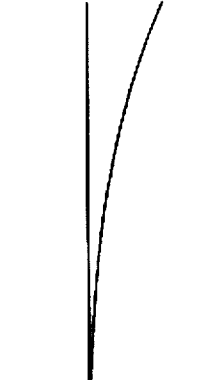
Figure 15A:
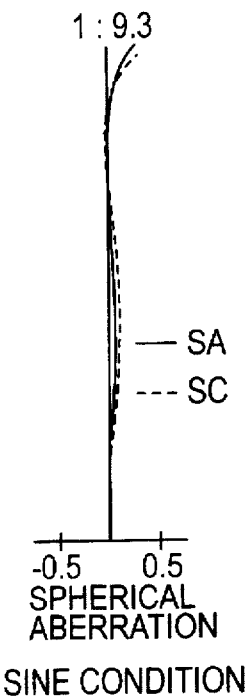
FIGS. 15A, 15B, 15C and 15D are aberration diagrams of the lens system shown in FIG. 13, at an intermediate focal length.
Figure 15B:
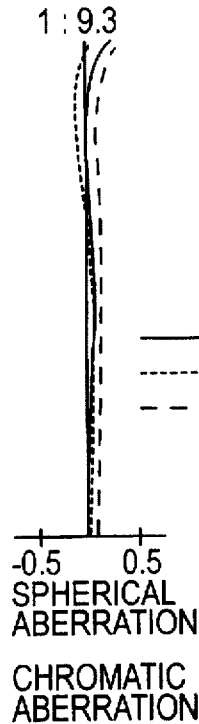
Figure 15C:
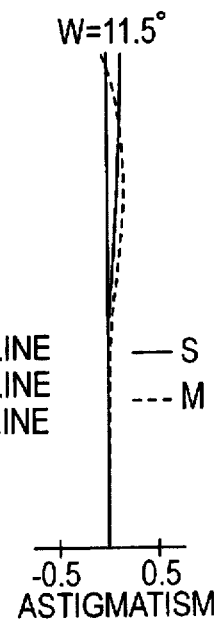
Figure 15D:
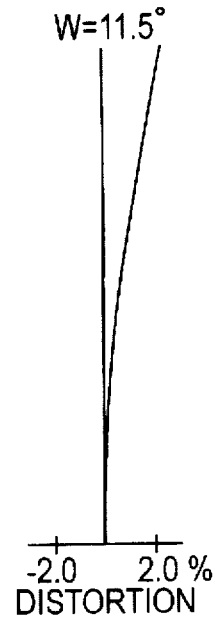
Figure 16A:
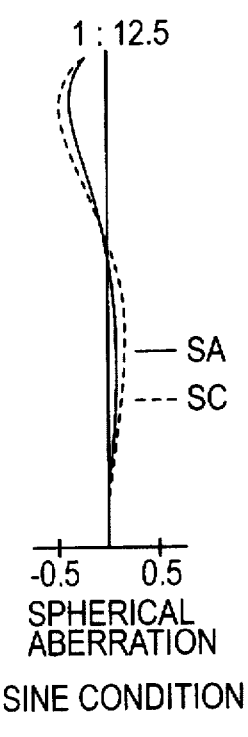
FIGS. 16A, 16B, 16C and 16D are aberration diagrams of the lens system shown in FIG. 13, at a longest focal length.
Figure 16B:
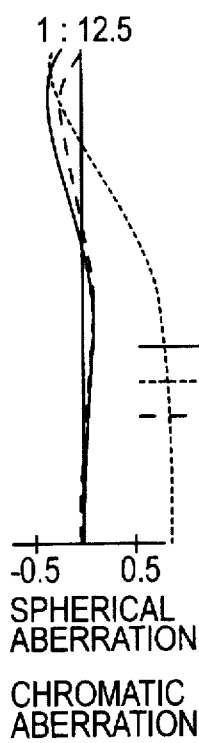
Figure 16C:
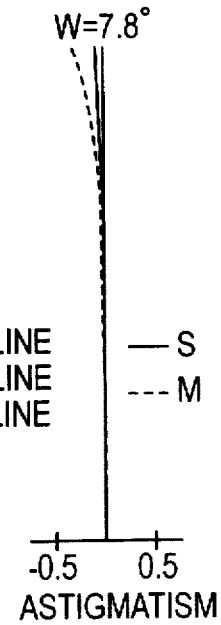
Figure 16D:
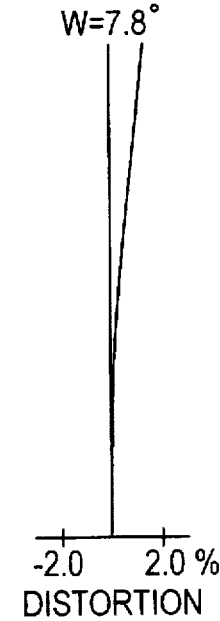

FIG. 13 shows a fourth embodiment of an optical system of a zoom lens having a high zoom ratio according to the present invention. FIGS. 14A through 14D, 15A through 15D, and 16A through 16D are diagrams showing various aberrations at a shortest focal length, an intermediate focal length and a longest focal length, respectively. Numerical data regarding the fourth embodiment is shown in Table 4 below.

TABLE 4

$F_{NO} = 1:4.5-9.3-12.5$
$f = 39.30-103.98-155.02$
$W = 28.1-11.5-7.8$
$f_B = 9.56-53.13-86.38$

| Surface No. | R | d | $N_d$ | $v_d$ |
|---|---|---|---|---|
| 1 | -23.810 | 2.00 | 1.73400 | 51.5 |
| 2 | 74.090 | 3.88 | 1.48749 | 70.2 |
| 3 | -20.097 | 0.10 | — | — |
| 4 | 33.281 | 3.76 | 1.48749 | 70.2 |
| 5 | -105.921 | 3.11-19.10-23.09 | — | — |
| 6 | -15.966 | 1.50 | 1.83481 | 42.7 |
| 7 | 20.339 | 2.30 | 1.84666 | 23.8 |
| 8 | 117.876 | 0.10 | — | — |
| 9 | 22.771 | 2.60 | 1.84666 | 23.8 |
| 10 | 14.683 | 2.58 | 1.56883 | 56.3 |
| 11 | -39.810 | 0.10 | — | — |
| 12 | 88.891 | 2.65 | 1.58913 | 61.2 |
| 13 * | -18.242 | 1.00 | — | — |
| stop | ∞ | 18.21-5.57-2.30 | — | — |
| 14 * | -31.463 | 4.00 | 1.58547 | 29.9 |
| 15 | -20.701 | 4.04 | — | — |
| 16 | -13.000 | 2.00 | 1.61800 | 63.4 |
| 17 | 189.593 | — | — | — |

*marked surface is rotationally, symmetrically aspherical.
Aspherical Data

No. 13: $K = 0.0, A4 = 0.45197 \times 10^{-4}, A6 = -0.68199 \times 10^{-7}$,
$A8 = 0.20809 \times 10^{-8}, A10 = 0.0, A12 = 0.0$ No. 14: $K = 0.0, A4 = 0.32729 \times 10^{-4}, A6 = -0.33728 \times 10^{-7}$,
$A8 = 0.12831 \times 10^{-8}, A10 = 0.0, A12 = 0.0$ Embodiment 5

Figure 17:
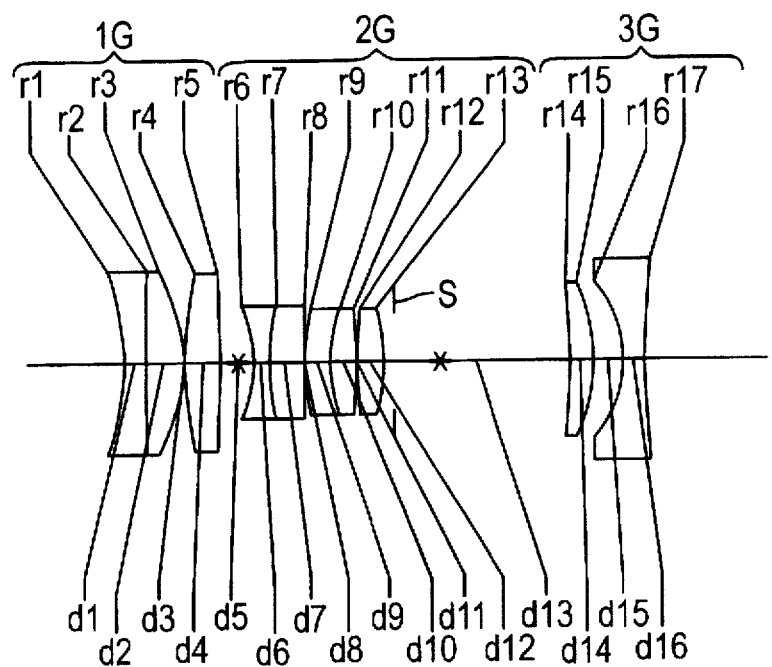
FIG. 17 is a schematic view of a lens arrangement of a zoom lens system having a high zoom ratio, according to a fifth embodiment of the present invention.
Figure 18A:
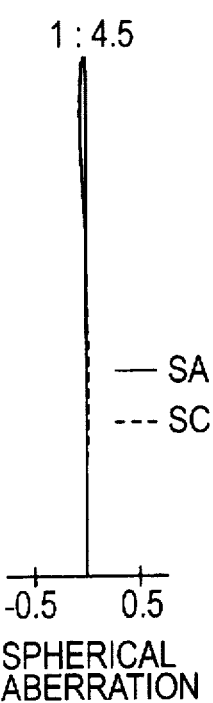
FIGS. 18A, 18B, 18C and 18D are aberration diagrams of the lens system shown in FIG. 17, at a shortest focal length.
Figure 18B:
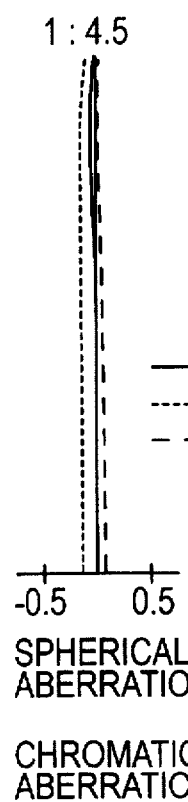
Figure 18C:
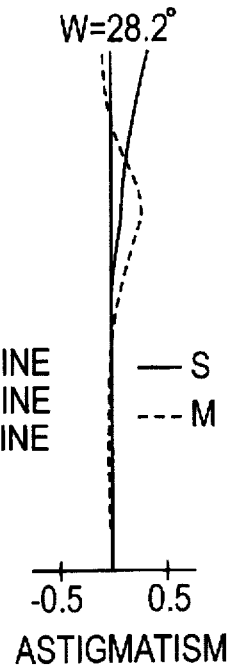
Figure 18D:
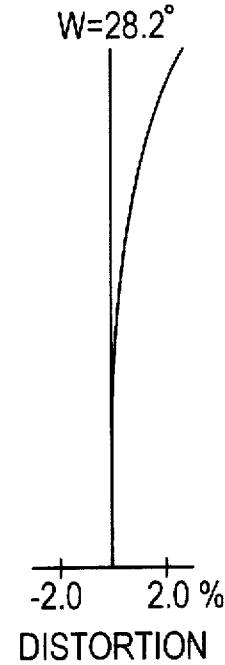
Figure 19A:
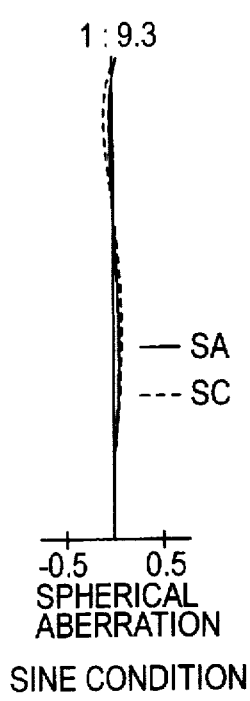
FIGS. 19A, 19B, 19C and 19D are aberration diagrams of the lens system shown in FIG. 17, at an intermediate focal length.
Figure 19B:
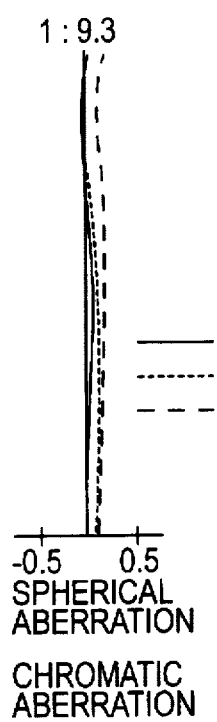
Figure 19C:
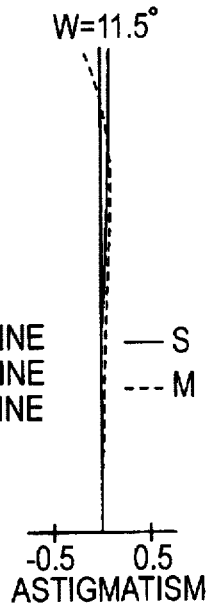
Figure 19D:
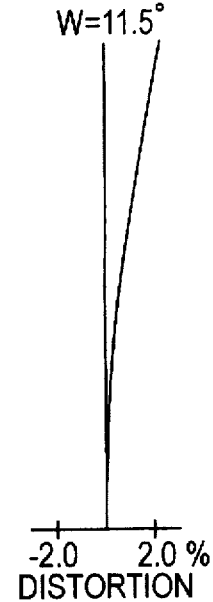
Figure 20A:
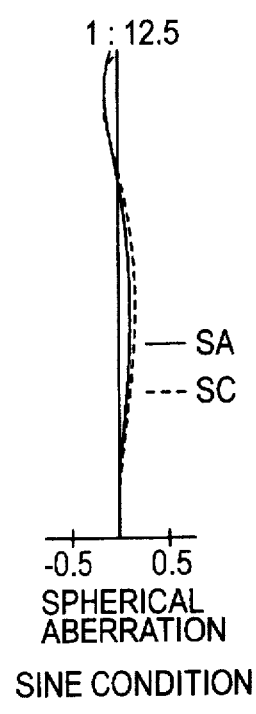
FIGS. 20A, 20B, 20C and 20D are aberration diagrams of the lens system shown in FIG. 17, at a longest focal length.
Figure 20B:
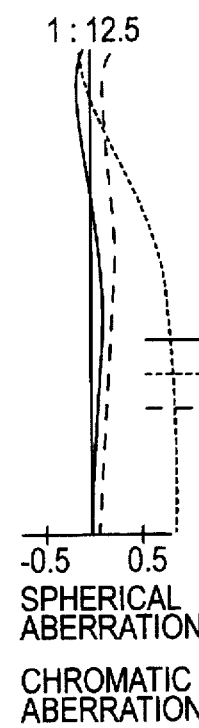
Figure 20C:
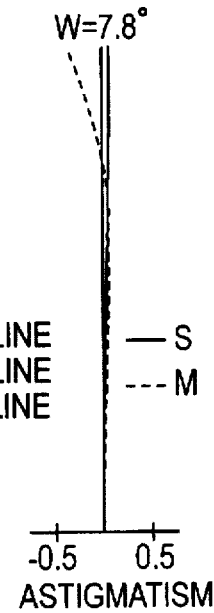
Figure 20D:
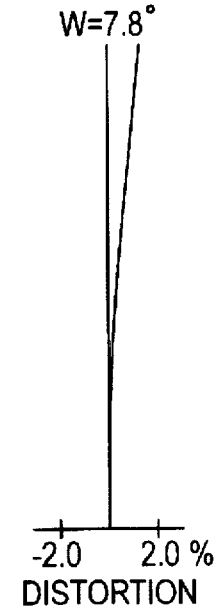
Figure 23A:
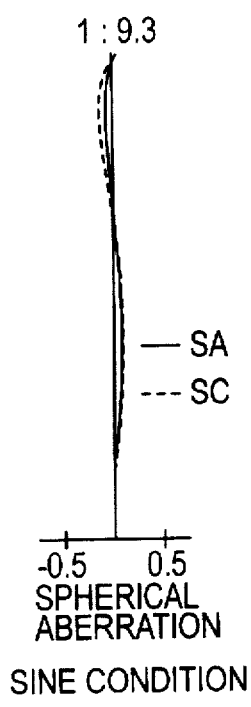
FIGS. 23A, 23B, 23C and 23D are aberration diagrams of the lens system shown in FIG. 21, at an intermediate focal length.
Figure 23B:
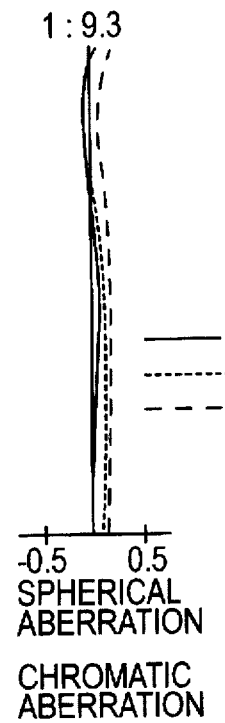
Figure 23C:
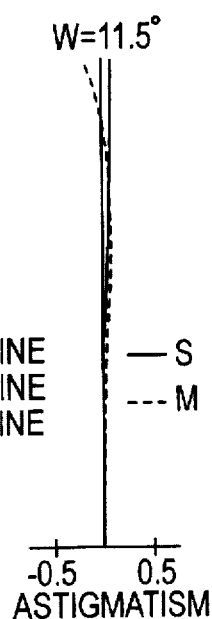
Figure 23D:
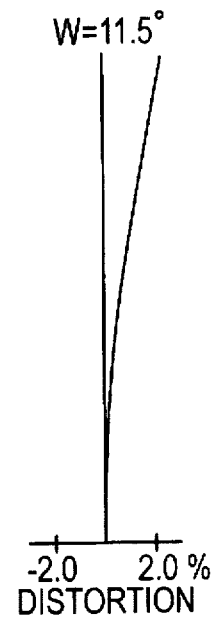
Figure 24A:
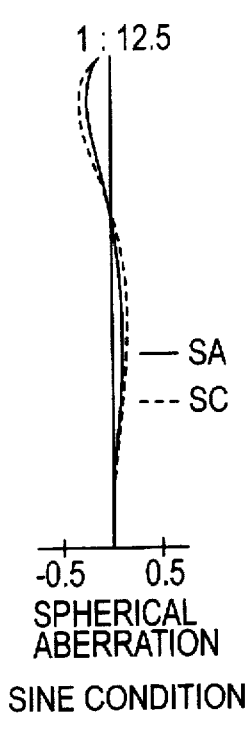
FIGS. 24A, 24B, 24C and 24D are aberration diagrams of the lens system shown in FIG. 21, at a longest focal length.
Figure 24B:
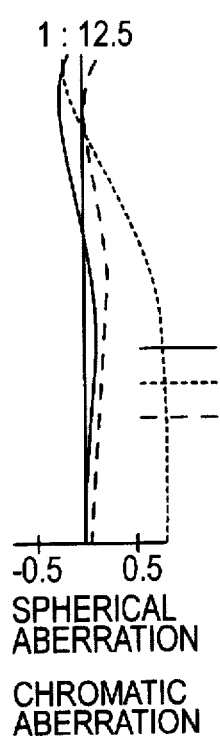
Figure 24C:
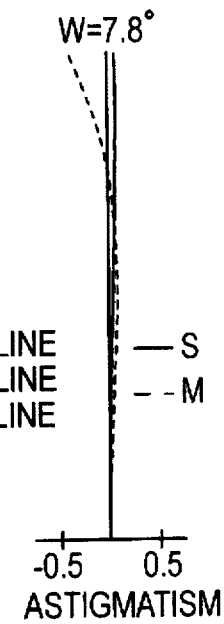
Figure 24D:
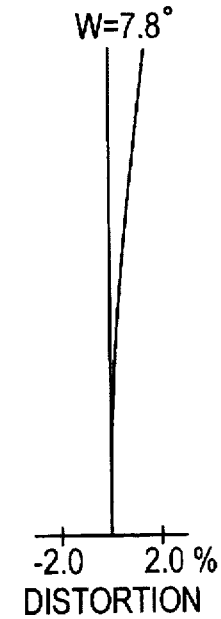

FIG. 17 shows a fifth embodiment of an optical system of a zoom lens having a high zoom ratio according to the present invention. FIGS. 18A through 18D, 19A through 19D, and 20A through 20D are diagrams showing various aberrations at a shortest focal length, an intermediate focal length and a longest focal length, respectively. Numerical data regarding the fifth embodiment is shown in Table 5 below.

TABLE 5

$F_{NO} = 1:4.5-9.3-12.5$
$f = 39.30-104.00-155.02$
$W = 28.2-11.5-7.8$
$f_B = 11.06-55.81-90.45$

| Surface No. | R | d | $N_d$ | $v_d$ |
|---|---|---|---|---|
| 1 | -25.252 | 2.00 | 1.76200 | 40.1 |
| 2 | 199.328 | 3.68 | 1.51742 | 52.4 |
| 3 | -22.457 | 0.10 | — | — |
| 4 | 34.401 | 3.69 | 1.48749 | 70.2 |
| 5 | -88.478 | 3.12-17.01-20.19 | — | — |
| 6 | -16.150 | 1.50 | 1.83481 | 42.7 |
| 7 | 20.459 | 3.75 | 1.84666 | 23.8 |
| 8 | 131.509 | 0.10 | — | — |
| 9 | 22.182 | 2.60 | 1.84666 | 23.8 |
| 10 | 14.056 | 2.58 | 1.56883 | 56.3 |
| 11 | -42.251 | 0.10 | — | — |
| 12 | 99.714 | 2.62 | 1.58913 | 61.2 |
| 13 * | -18.566 | 1.00 | — | — |
| stop | ∞ | 17.65-5.39-2.30 | — | — |
| 14 * | -42.021 | 2.32 | 1.58547 | 29.9 |
| 15 | -21.663 | 3.10 | — | — |
| 16 | -13.000 | 2.00 | 1.61800 | 63.4 |
| 17 | 81.676 | — | — | — |

*marked surface is rotationally, symmetrically aspherical.

TABLE 5-continued $F_{NO} = 1:4.5-9.3-12.5$
$f = 39.30-104.00-155.02$
$W = 28.2-11.5-7.8$
$f_B = 11.06-55.81-90.45$

| Surface No. | R | d | $N_d$ | $v_d$ |
|---|---|---|---|---|

Aspherical Data

No. 13: K = 0.0, A4 = 0.45130 × 10⁻⁴, A6 = −0.77045 × 10⁻⁷,
A8 = 0.14613 × 10⁻⁸, A10 = 0.0, A12 = 0.0
No. 14: K = 0.0, A4 = 0.39120 × 10⁻⁴, A6 = −0.42549 × 10⁻⁷,
A8 = 0.13687 × 10⁻⁸, A10 = 0.0, A12 = 0.0

Embodiment 6

FIG. 21 shows a sixth embodiment of an optical system of a zoom lens having a high zoom ratio according to the present invention. FIGS. 22A through 22D, 23A through 23D, and 24A through 24D are diagrams showing various aberrations at a shortest focal length, an intermediate focal length and a longest focal length, respectively. Numerical data regarding the sixth embodiment is shown in Table 6 below.

TABLE 6

$F_{NO} = 1:4.5-9.3-12.5$
$f = 39.30-103.99-155.00$
$W = 28.2-11.5-7.8$
$f_B = 10.99-56.15-91.00$

| Surface No. | R | d | $N_d$ | $v_d$ |
|---|---|---|---|---|
| 1 | −24.609 | 2.00 | 1.80100 | 35.0 |
| 2 | 259.597 | 3.61 | 1.56732 | 42.8 |
| 3 | −22.348 | 0.10 | — | — |
| 4 | 35.400 | 3.69 | 1.48749 | 70.2 |
| 5 | −91.937 | 3.31-16.89-20.09 | — | — |
| 6 | −16.232 | 1.50 | 1.83481 | 42.7 |
| 7 | 19.900 | 3.86 | 1.84666 | 23.8 |
| 8 | 121.900 | 0.10 | — | — |
| 9 | 21.918 | 2.60 | 1.84666 | 23.8 |
| 10 | 13.858 | 2.58 | 1.56883 | 56.3 |
| 11 | −42.285 | 0.10 | — | — |
| 12 | 96.536 | 2.63 | 1.58913 | 61.2 |
| 13 * | −18.711 | 1.00 | — | — |
| stop | ∞ | 17.71-5.40-2.30 | — | — |
| 14 * | −38.445 | 2.32 | 1.58547 | 29.9 |
| 15 | −20.798 | 3.17 | — | — |
| 16 | −13.000 | 2.00 | 1.61800 | 63.4 |
| 17 | 85.936 | — | — | — |

*marked surface is rotationally, symmetrically aspherical.
Aspherical Data

No. 13: K = 0.0, A4 = 0.44408 × 10⁻⁴, A6 = −0.91376 × 10⁻⁷,
A8 = 0.17896 × 10⁻⁸, A10 = 0.0, A12 = 0.0
No. 14: K = 0.0, A4 = 0.37413 × 10⁻⁴, A6 = −0.76145 × 10⁻⁷,
A8 = 0.17857 × 10⁻⁸, A10 = 0.0, A12 = 0.0

Table 7 below shows numerical values of relationships (1) through (17) for the six embodiments mentioned above.

TABLE 7

| | Embodiment | | |
|---|---|---|---|
| | 1 | 2 | 3 |
| (1) | 4.65 | 4.65 | 4.80 |
| (2) | 1.94 | 2.04 | 2.21 |
| (3) | 49.3 | 49.3 | 49.3 |
| (4) | 20.9 | 20.9 | 20.9 |
| (5) | −0.211 | −0.228 | −0.237 |
| (6) | 4.40 | 4.50 | 4.65 |
| (7) | 0.08 | 0.08 | 0.08 |
| (8) | 9.67 | 10.09 | 10.69 |
| (9) | ○ | ○ | ○ |
| (10) | ○ | ○ | ○ |
| (11) | 6.71 | 7.01 | 7.43 |
| (12) | ○ | ○ | ○ |
| (13) | 1.74320 | 1.74320 | 1.74320 |
| (14) | 0.25571 | 0.25571 | 0.25571 |
| (15) | −0.846 | −0.803 | −0.787 |
| (16) | −0.3898 | −0.3847 | −0.3832 |
| (17) | — | — | — |

| | Embodiment | | |
|---|---|---|---|
| | 4 | 5 | 6 |
| (1) | 4.51 | 4.69 | 4.69 |
| (2) | 2.26 | 2.46 | 2.46 |
| (3) | 51.5 | 40.1 | 35.0 |
| (4) | 18.7 | 12.3 | 7.8 |
| (5) | −0.187 | −0.230 | −0.205 |
| (6) | 3.90 | 4.06 | 4.05 |
| (7) | 0.08 | 0.09 | 0.09 |
| (8) | 9.24 | 9.06 | 9.11 |
| (9) | ○ | ○ | ○ |
| (10) | ○ | ○ | ○ |
| (11) | 6.21 | 6.29 | 6.25 |
| (12) | — | — | — |
| (13) | 1.73400 | 1.76200 | 1.80100 |
| (14) | 0.24651 | 0.24458 | 0.23368 |
| (15) | −0.606 | −0.642 | −0.626 |
| (16) | −0.4063 | −0.4109 | −0.4130 |
| (17) | 63.4 | 63.4 | 63.4 |

As can be understood from Table 7, the first through third embodiments satisfy the requirements defined by the relationships other than relationship (17), i.e., relationships (1) through (16), and the fourth through sixth embodiments satisfy the requirements defined by the relationships other than relationship (12), i.e., relationships (1) through (11) and relationships (13) through (17). The symbol "○" represents that the result is "good". Since the third lens group includes a cemented lens element unit in the first through third embodiments, there is no numerical data for relationship (17). Also, since the third lens group does not include a cemented lens element unit in the fourth through sixth embodiments, there is no numerical data for relationship (12). It can be understood from the aberration diagrams that in a small zoom lens whose zoom ratio is approximately 4 in each embodiment, the chromatic aberrations are satisfactorily corrected.

As is understood from the above discussion, according to the present invention, a small zoom lens whose zoom ratio is approximately 4 or more and in which the chromatic aberrations can be appropriately corrected can be provided.

What is claimed is:

1. A zoom lens comprising at least three lens groups including a first lens group having positive power, a second lens group having positive power, and a third lens group having negative power, arranged in this order from an object side, said at least three lens groups being moved toward said object side during a zooming operation from a shortest focal length position toward a longest focal length position, wherein said first lens group includes a negative first lens element, a positive second lens element and a positive third lens element arranged in this order from said object side and said zoom lens satisfies the following relationships:

$4.3 < m_{3T} < 6$
$1.7 < f_7/f_{1G} < 3$
$31 < v_1 < 55$ $0<v_2-v_1<30$ where $m_{3T}$ represents a lateral magnification of said third lens group at said longest focal length position, $f_T$ represents a focal length of the zoom lens at said longest focal length position, $f_{1G}$ represents a focal length of said first lens group, $v_1$ represents an Abbe number of said negative first lens element of said first lens group, and $v_2$ represents an Abbe number of said positive second lens element of said first lens group.

2. The zoom lens according to claim 1, wherein said zoom lens satisfies the following relationship:

$-0.5<f_W/f_{12}<0$ where $f_W$ represents a focal length of said zoom lens at said shortest focal length position, and $f_{12}$ represents a resultant focal length of said negative first lens element and said positive second lens element of said first lens group.

3. The zoom lens according to claim 1, wherein said negative first and positive second lens elements of said first lens group are cemented to each other.

4. The zoom lens according to claim 1, wherein said zoom lens satisfies the following relationships:

$3.5<f_T/f_{2G}<5.0$ $0.05<\Sigma d_{2G}/f_T<0.1$ where $f_{2G}$ represents a focal length of said second lens group, and $\Sigma d_{2G}$ represents a distance between a first surface of said second lens group and a last surface of said second lens group.

5. The zoom lens according to claim 4, wherein said second lens group has at least two cemented lens element units including of a first cemented lens element unit of negative power and a second cemented lens element unit of positive power, arranged in this order from said object side, and wherein each of said cemented lens element units is made of cemented negative and positive lens elements and satisfies the following relationships:

$8<f_T/|f_{2Gn}|<11$ $v_{2n-N}>v_{2n-P}$ $v_{2p-N}<v_{2p-P}$ where $f_{2Gn}$ represents a focal length of said first cemented lens element unit of negative power belonging to said second lens group, $v_{2n-N}$ represents an Abbe number of said negative lens element of said first cemented lens element unit of negative power belonging to said second lens group, $v_{2n-P}$ represents an Abbe number of said positive lens element of said first cemented lens element unit of negative power belonging to said second lens group, $v_{2p-N}$ represents an Abbe number of said negative lens element of said second cemented lens element unit of positive power belonging to said second lens group, and $v_{2p-P}$ represents an Abbe number of said positive lens element of said second cemented lens element unit of positive power belonging to said second lens group.

6. The zoom lens according to claim 1, wherein said third lens group of negative power includes a positive lens element and a cemented lens element unit of negative power, arranged in this order from said object side, and wherein said cemented lens element unit is made of cemented negative and positive lens elements and satisfies the following relationships:

$5<f_{Thd} T/|f_{3G}|<8.5$ ($f_{3G}<0$)

$v_{3N}>v_{3P}$ wherein $f_{3G}$ represents a focal length of said third lens group, $v_{3N}$ represents an Abbe number of said negative lens element of said cemented lens element unit of said third lens group, and $v_{3P}$ represents an Abbe number of said positive lens element of said cemented lens element unit of said third lens group.

7. A zoom lens comprising at least three lens groups including a first lens group having positive power, a second lens group having positive power, and a third lens group having negative power, arranged in this order from an object side, said at least three lens groups being moved toward said object side during a zooming operation from a shortest focal length position toward a longest focal length position, wherein said first lens group includes at least one cemented lens element unit, said second lens group includes at least two cemented lens element units, such that the zoom lens includes at least three cemented lens element units, and wherein said zoom lens satisfies the following relationship:

$4.3<m_{3T}<6$ where $m_{3T}$ represents a lateral magnification of said third lens group at said longest focal length position.

8. The zoom lens according to claim 7, wherein said third lens group includes a negative lens element, and said zoom lens system satisfies the following relationship:

$60<v'_{3N}$ where $v'_{3N}$ represents an Abbe number of said negative lens element of said third lens group.

9. A zoom lens comprising at least three lens groups including a first lens group having positive power, a second lens group having positive power, and a third lens group having negative power, arranged in this order from an object side, said at least three lens groups being moved toward said object side during a zooming operation from a shortest focal length position toward a longest focal length position, wherein said first lens group includes at least one cemented lens element unit, said second lens group includes at least two cemented lens element units, said third lens group includes at least one cemented lens element unit, such that the zoom lens includes at least four cemented lens element units.

10. The zoom lens according to claim 9, wherein said zoom lens satisfies the following relationship:

$4.3<m_{3T}<6$ where $m_{3T}$ represents lateral magnification of said third lens group at said longest focal length position.

11. The zoom lens according to claim 1, wherein said zoom lens satisfies the following relationships:

$1.7<n_1$ $0.15<n_1-n_2$ wherein $n_1$ represents a refractive index of said negative first lens element of said first lens group, and $n_2$ represents a refractive index of said positive second lens element of said first lens group.

12. The zoom lens according to claim 1, wherein said zoom lens satisfies the following relationship:

$-1.5<r_1/f_W<-0.5$ where $r_1$ represents a radius of curvature of a first surface of a first lens element of said first lens group, and $f_W$ represents a focal length of said zoom lens at said shortest focal length position.

13. The zoom lens according to claim 5, wherein said zoom lens satisfies the following relationship:

$-1<r_2Gn_1/f_W<-0.25$ where $r_2Gn_1$ represents a radius of curvature of a first surface of said second lens group located closest to said first lens group and $f_W$ represents a focal length of said zoom lens at said shortest focal length position.

* * * * *

UNITED STATES PATENT AND TRADEMARK OFFICE
CERTIFICATE OF CORRECTION

PATENT NO. : 5,793,535
DATED : August 11, 1998
INVENTOR(S) : ITO et al.

It is certified that error appears in the above-identified patent and that said Letters Patent is hereby corrected as shown below:

At column 15, line 13 (claim 2, line 4), delete "f," and insert —$f_w$—-.

At column 15, line 63 (claim 6, line 8) delete "$5<fhd\ T/|f_{3G}|<8.5\ (f_{3G}<0)$ and insert —$5<f_T/|f_{3G}|<8.5\ (f_{3G}<0)$—.

At column 16, line 41 (claim 10, line 4), after "represents" insert —a—.

At column 16, line 64 (claim 13, line 6) after "group" insert —,—.

Signed and Sealed this

Twenty-first Day of September, 1999

Attest:

*Attesting Officer*

Q. TODD DICKINSON

*Acting Commissioner of Patents and Trademarks*